United States Patent [19]
Barnes et al.

[11] Patent Number: 6,122,558
[45] Date of Patent: Sep. 19, 2000

[54] AGGREGATION OF SYSTEM SETTINGS INTO OBJECTS

[75] Inventors: David A. Barnes; Joyce A. Grauman; Renee Marceau; Virginia E. S. Howlett, all of Seattle; Kevin Schofield, Bellevue; Mark A. Malamud, Seattle; Issac J. Heizer, Woodinville; Daniel F. E. Plastina, Redmond; Chris E. Tobey, Seattle; Rosanne M. Lehmann, Seattle; William T. Flora, Seattle; Eric L. Van Doren, Seattle, all of Wash.

[73] Assignee: Microsoft Corporation, Redmond, Wash.

[21] Appl. No.: 08/935,158

[22] Filed: Sep. 22, 1997

Related U.S. Application Data

[63] Continuation of application No. 08/366,058, Dec. 29, 1994, abandoned.

[51] Int. Cl.[7] ................................................ G05B 11/01
[52] U.S. Cl. ................................................ 700/83; 700/17
[58] Field of Search .............................. 700/83, 84, 17; 345/353, 352, 347, 333

[56] References Cited

U.S. PATENT DOCUMENTS

| | | | |
|---|---|---|---|
| 4,896,291 | 1/1990 | Gest et al. | 345/353 |
| 5,455,378 | 10/1995 | Paulson et al. | 84/610 |
| 5,542,039 | 7/1996 | Brinson et al. | 395/161 |
| 5,682,490 | 10/1997 | Sumino et al. | 345/352 |
| 5,821,932 | 10/1998 | Pittore | 345/347 |

OTHER PUBLICATIONS

*Microsoft® Windows™ and MS–DOS® 6, User's Guide*, Microsoft Corporation; 1993; Chapter 12, "Customizing Windows," pp. 122–139.

*Microsoft® Windows NT™ Advanced Server, Version 3.1, System Guide*, Microsoft Corporation; 1993; "Overview," pp. 112–113 and 132–133.

*Primary Examiner*—Paul P. Gordon
*Attorney, Agent, or Firm*—Banner & Witcoff, Ltd.

[57] ABSTRACT

A control panel provides controllers for setting the values of system settings. Each controller controls a subset of related system settings. Scheme objects are provided for encapsulating values of system settings for a controller. The current values of system settings controlled by a controller may be updated by applying the values held within a scheme. Grand schemes are provided for aggregating the system settings for multiple controllers. Thus, the system settings controlled by multiple controllers may be updated in a single transaction by applying a grand scheme to the control panel. Easily practiced approaches to applying schemes and grand schemes to the control panel are provided. Moreover, methods for easily creating and editing the contents of schemes and grand schemes are provided.

42 Claims, 18 Drawing Sheets

AGGREGATION OF SYSTEM SETTINGS INTO OBJECTS

CROSS-REFERENCE TO RELATED APPLICATION

This application is a continuation of U.S. patent application Ser. No. 08/366,058, filed Dec. 29, 1994, now abandoned.

TECHNICAL FIELD

This invention relates generally to data processing systems and, more particularly, to system settings within data processing systems that control an operating environment.

BACKGROUND OF THE INVENTION

The Microsoft WINDOWS, version 3.1, operating system, sold by Microsoft Corporation of Redmond, Wash., provides a control panel that allows a user to adjust various system settings, such as the color settings for the graphical user interface. The control panel includes a number of controllers that adjust groups of settings. For example, a separate color controller is provided to adjust the color settings that are used by the operating system. Each controller generates a dialog box when activated that allows a user to select the system settings that are controlled by the controller. The operating system provides default settings for each of the system settings that are controlled by the controllers. However, in order to change the system settings, the user must activate each controller in turn to adjust system settings which the user wishes to change.

SUMMARY OF THE INVENTION

In accordance with the first aspect of the present invention, a method is practiced in a computer system having a video display and a storage device. The computer system runs an operating system that provides a desktop environment to a user and a file system. The desktop environment has associated systems settings that affect the desktop environment. In this method, a first set of values for at least a portion of the system settings are stored in the storage device so that the first set of values is visible in the file system. A second set of values, for the same portion of the system settings for which values are stored in the first set of values, is also stored in the storage device such that the second set of values is visible in the file system. In response to a choice by the user between the first set of values and the second set of values, the system settings are updated to have the values specified by the chosen set of values.

In accordance with another aspect of the present invention, a control panel is provided as part of an operating system that is run on a computer system. The control panel is used to control values assigned to system settings that control an operating environment provided to a user. Sets of values for the system settings are stored in the storage device. Each set of values includes values for at least a portion of the system settings. The user selects ones of the sets of values via a provided interface, and the current system settings are changed to have the values of the selected set of values.

In accordance with a further aspect of the present invention, a control panel is provided for controlling current values of the system settings. The control panel includes controllers that are each responsible for controlling current values of a group of related ones of the system settings. The sets of values are visible in a file system of the operating system. The user is provided with at least two sets of values for an identified one of the groups of related system settings. The user selects one of the two sets of values, and in response to the user selection, the current values of the identified group of related system settings are changed to the values of the set selected by the user.

In accordance with an additional aspect of the present invention, a grand scheme container object is stored in a storage device. Scheme objects are stored within the grand scheme container object. Each scheme object holds a set of values for a subset of the system settings. The values held in the scheme objects that are contained within the grand scheme container object are applied to the current system settings so that the current system settings assume the values held in the scheme objects.

In accordance with another object of the present invention, a method is practiced in a computer system having an input device and a video display. The computer system runs an operating system that provides an operating environment to a user as specified by system settings. A first object holds values for system settings and has a representation that is displayed on the video display. A second object also holds system settings and also has a representation on the video display. The representation of the first object is dragged to lie over at least a portion of the representation of the second object in response to the user using the input device. The representation of the first object is dropped on the representation of the second object. In response to the dropping of the representation of the first object in the representation of the second object, the values for system settings are changed in the second object to the values contained within the first object.

In accordance with a further aspect of the present invention, a data processing system includes a processor for running an operating system. The operating system provides a file system and a desktop environment to the user. The desktop environment has an associated set of system settings that affect the environment. The data processing system also includes storage. The storage holds a copy of the operating system and a first and second set of values. The sets of values for a portion of the system settings are visible within the file system. The data processing system provides a vehicle for updating the system settings in response to the user choice of one of the sets of values such that the system settings assume the values of the set of values chosen by the user.

In accordance with a final aspect of the present invention, a system for providing a desktop environment to a user is provided. The desktop environment has an associated set of system settings that affect the desktop environment. The system includes a display component for displaying an interface to a user as part of the desktop environment. The display component displays the interface according to system settings. The system also includes a first container holding a first set of system setting values and a second container holding a second set of system setting values. The system additionally includes a selection component that receives selection information, and in response to this selection information, selects between the first container and the second container. A change component is provided as part of the system that is responsible to the selection made by the selection component to change the system settings to those held in the selected container.

DETAILED DESCRIPTION OF THE INVENTION

The preferred embodiment of the present invention provides a user with a quick and easy way to change groups of system settings in one transaction. Specifically, the preferred embodiment of the present invention supports the use of schemes and grand schemes on a per user per desktop basis. Schemes are entities that hold collections of system settings for a particular controller of a control panel (i.e., a control panel applet). Grand schemes are collections of settings for a set of one or more controllers. Through the use of schemes or grand schemes, a user can update a group of settings associated with a controller or group of controllers. The user merely needs to specify the scheme or grand scheme that is to be used to establish the settings and then request that the scheme or grand scheme be applied. The user may store a number of different schemes and grand schemes within the system. The controllers, schemes, and grand schemes are all implemented as objects that may be dragged and dropped to establish and change system settings.

Figure 1:
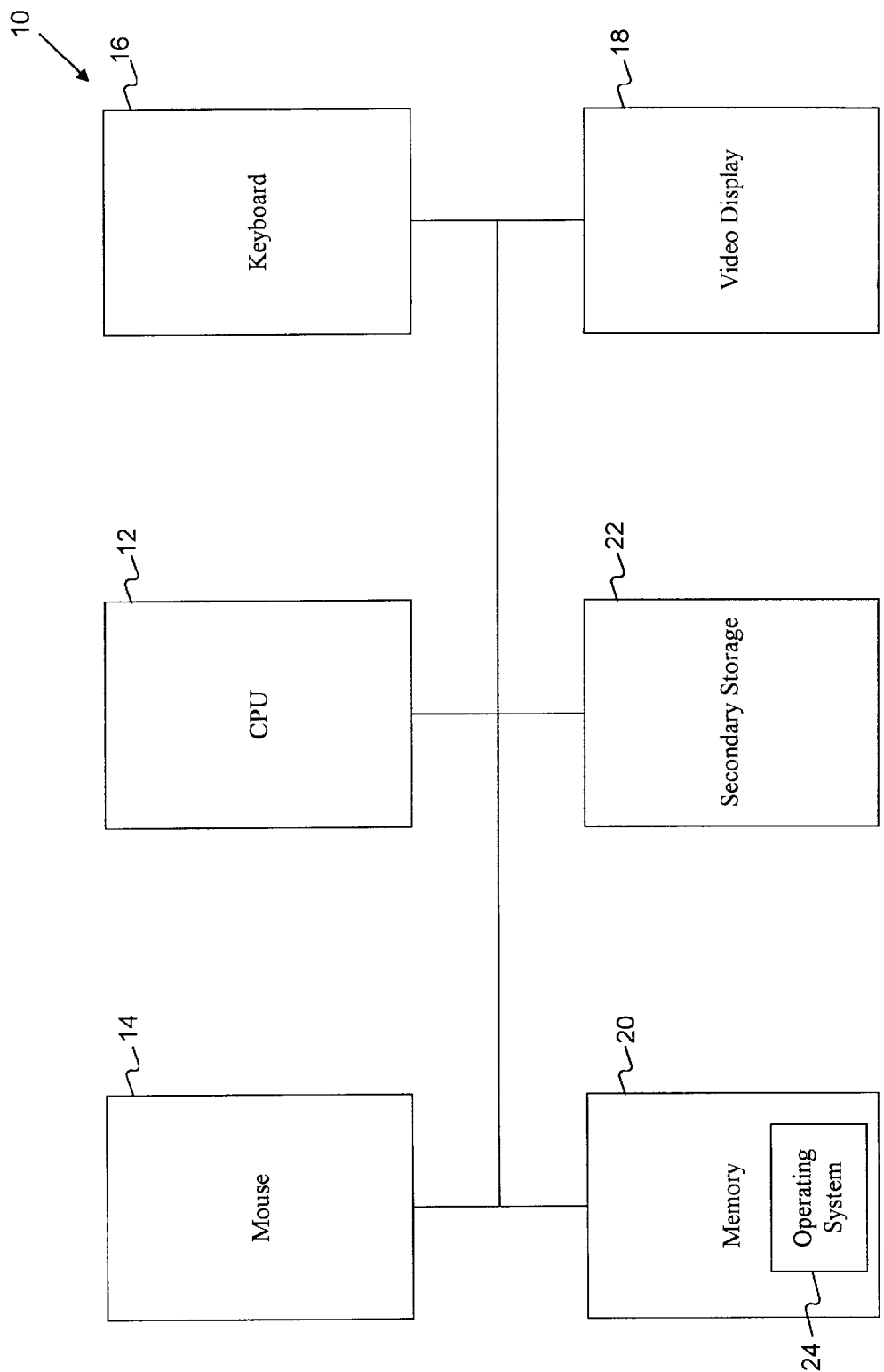
FIG. 1 is a block diagram of a computer system that is suitable for practicing a preferred embodiment of the present invention.

FIG. 1 is a block diagram of a computer system 10 that is suitable for practicing the preferred embodiment of the present invention. The computer system includes a central processing unit (CPU) 12 that controls the activities of the computer system. The CPU 12 may be a microprocessor or other type of commercially available CPU. The computer system 10 also includes input devices, such as mouse 14 and keyboard 16. A video display 18 is provided in the computer system 10 to display video output to the user. A memory 20 and a secondary storage device 22 provide storage facilities within the computer system 10. The secondary storage device 22 may be a hard disk drive or other suitable secondary storage device. The memory 20 holds a copy of an operating system 24. In the preferred embodiment of the present invention, the operating system 24 is used to store and manage the control panel, the schemes, and the grand schemes.

Figure 2:
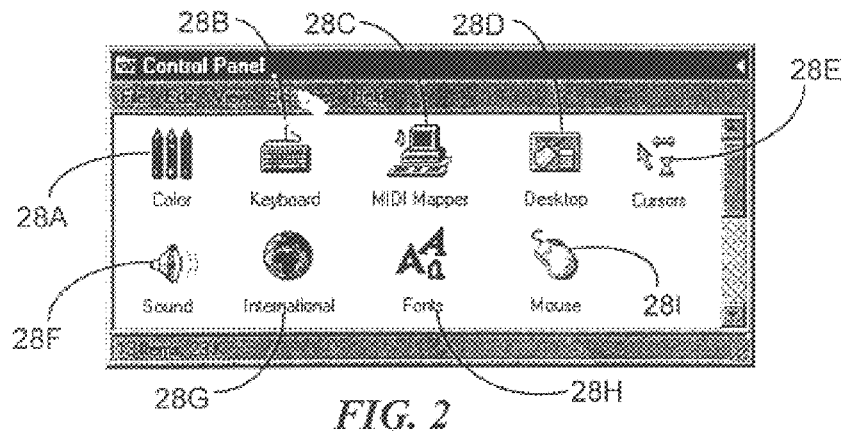
FIG. 2 is a diagram illustrating an example control panel window in accordance with the preferred embodiment of the present invention.

In order to understand the use of schemes and grand schemes within the preferred embodiment of the present invention, it is helpful to first review the role the control panel serves within the computer system 10. As was discussed in the Background of the Invention, the control panel is provided by the operating system 24 to enable the user to adjust system settings. FIG. 2 shows an open control panel window that includes a separate icon 28A–28I for each controller. The controllers in FIG. 2 include a color controller 28A, a keyboard controller 28B, a MIDI mapper controller 28C, a desktop controller 28D, a cursors controller 28E, a sound controller 28F, an international controller 28G, a fonts controller 28H and a mouse controller 28I.

Figure 3:
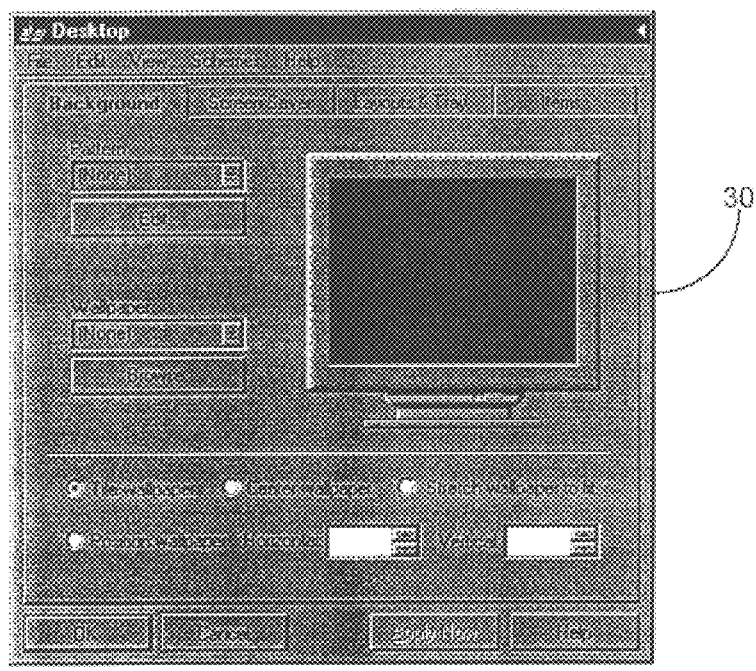
FIG. 3 is an example of a dialog box for a controller for the control panel of FIG. 2.

The controllers are sections of code that control the system settings for groups of related settings. For example, the desktop controller controls the appearance of the virtual desktop to the user. When the user positions a mouse cursor through the use of mouse 14 to point at one of the icons 28A–28I shown in the control panel window 26 and then double clicks a button of the mouse, a dialog box for adjusting the system settings of the associated controller is displayed. FIG. 3 shows an example of the dialog box 30 that is displayed when a user double clicks on the desktop controller icon 28. The dialog box 30 includes a number of list boxes, option boxes, and other user interface controls that allow a user to select the settings that are controlled by the controller.

The preferred embodiment of the present invention is employed using the Microsoft Object Linking and Embedding (OLE) 2.0 protocol of Microsoft Corporation. In order to understand the implementation details of the preferred embodiment of the present invention, it is useful to first review some of the concepts employed in Microsoft OLE 2.0 that are relevant to the present invention.

Microsoft OLE 2.0 is a protocol that follows a specific object model. An "object" in Microsoft OLE 2.0 is a data abstraction that encapsulates related behavior and attributes. Typically, an object includes a number of functions and data structures. Nevertheless, in certain instances an object may include only functions. A "container object" is an object that contains other objects within it.

An "interface" in Microsoft OLE 2.0 is a group of semantically related functions that are organized into a named unit (the name being the identifier of the interface). Interfaces have no instantiation per se (i.e., the definition for an interface does not include code for implementing the functions that are identified within an interface); rather, interface definitions merely specify a set of signatures for identified functions. "Instantiation" refers to the process of creating in memory structures that represent an object so that operations can be evoked on the object. When an object "supports" an interface, the object provides code for the functions specified by the interface. Thus, the objects that support the interfaces are responsible for providing the code for implementing the functions of the interfaces. The code provided by an object must comply with the signatures of the interface definition. The run-time manifestation of an interface instance is a data structure that provides access to the functions defined for the interface. Interface instances are referenced by clients of a server object using interface pointers. Hence, when a client object is provided with an interface pointer, the client object is able to invoke the functions of the instance of interface that is provided by the server object.

Schemes, controllers, and grand schemes are all implemented as objects within the preferred embodiment of the present invention. These objects support certain interfaces that will be described in more detail below. Microsoft OLE 2.0 supports the notion of "object classes." An object class groups together objects having similar properties and common behavior.

A scheme in the preferred embodiment of the present invention is an object that is a document for containing the settings of a particular controller. For example, a scheme for the desktop controller may include settings that specify the desktop pattern, screen saver parameters, wallpaper patterns, sizing grid parameters, spacing between icons, and cursor click rate. Each controller is an object that provides code for implementing the dialog box and displaying the icon associated with the controller.

A grand scheme is a special type of container object that contains one or more scheme objects. The grand scheme is well-suited for encapsulating system settings that produce a desktop of a given motif. For instance, a grand scheme might encapsulate system settings that produce a cowboy motif. Thus, the desktop settings in the grand scheme might include a wallpaper with cars on it and a rustic pattern. Moreover, the sound settings in the grand scheme may include cowboy cries and the sound of hoofs. The preferred embodiment of the present invention implements a grand scheme as an object of the grand scheme class. Similarly, controllers and schemes are implemented as objects of controller and scheme object classes, respectively. All of these objects have associated icons and windows.

Figure 4:
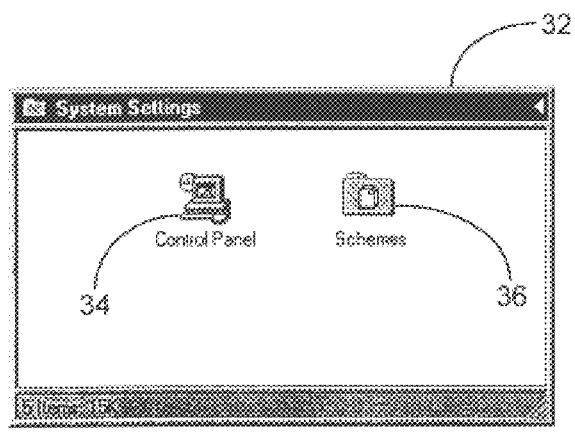
FIG. 4 is a diagram illustrating an example of a default systems setting window provided by the preferred embodiment of the present invention.

In the preferred embodiment of the present invention, the control panel and the schemes are held within a system settings folder. When the system settings folder is opened, a system settings window 32, as shown in FIG. 4, is displayed. An icon 34 for the control panel and an icon 36 for the schemes are displayed within the system settings window. When a user double clicks on the icon 34 for the control panel, the user sees the control panel window 26 shown in FIG. 2. When the user double clicks on the schemes icon 36, the schemes and grand schemes stored within the schemes folder become visible.

A schemes folder is associated with each virtual desktop. Thus, different users that share a single machine may have separate sets of schemes and grand schemes or share such schemes or grand schemes. Moreover, schemes and grand schemes are stored on a per desktop basis such that a user having multiple virtual desktops may have a separate set of schemes and grand schemes for each virtual desktop. The schemes and grand schemes that are objects visible in the file system provided by the operating system.

Figure 5:
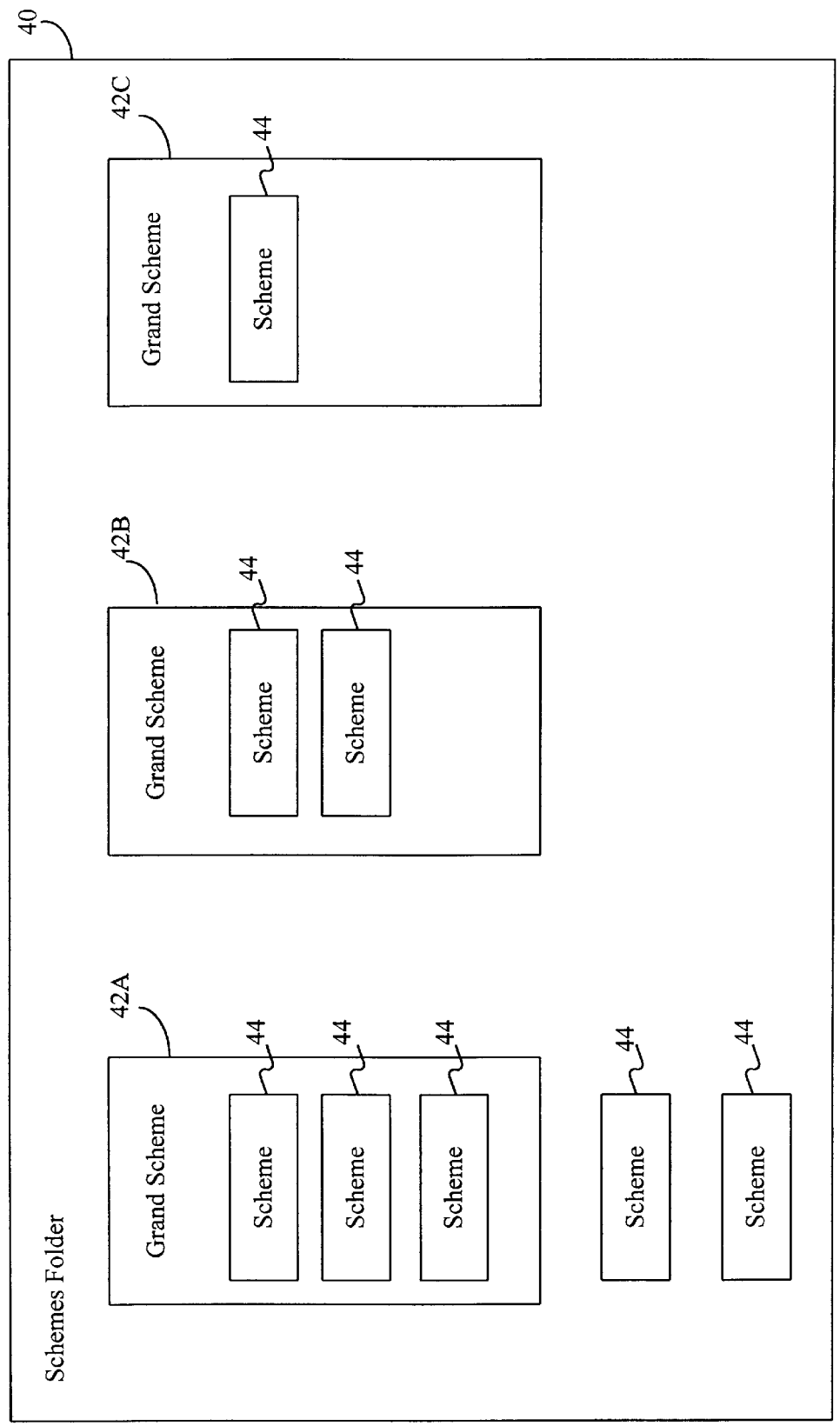
FIG. 5 is a diagram illustrating the hierarchy among a schemes folder, grand schemes and schemes in accordance with the preferred embodiment of the present invention.

FIG. 5 is a block diagram that illustrates the contents of an example schemes folder 40. This schemes folder holds grand schemes 42A, 42B, and 42C, and each of the grand schemes contains one or more schemes 44. The schemes folder 40 also holds additional schemes 44 that are not contained within any grand schemes. Those skilled in the art will appreciate that the contents of the schemes folder 40 shown within FIG. 5 are merely illustrative. The schemes folder 40 may hold different contents, including objects that are neither schemes nor grand schemes.

Figure 6:
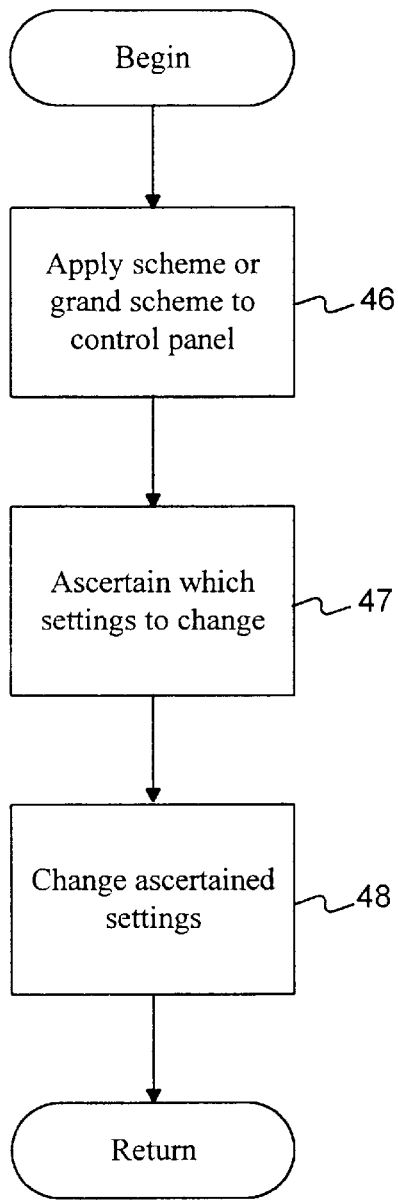
FIG. 6 is a flow chart illustrating how schemes and grand schemes are used to change system settings.

Once the schemes or grand schemes are created, they may be used to adjust the settings within the control panel. FIG. 6 shows a flow chart of the steps performed to adjust the settings within the control panel using schemes or grand schemes. Initially, the scheme or grand scheme is applied to the control panel (step 46). As will be described in more detail below, there are a number of different vehicles for applying the schemes or grand schemes to the control panel. A determination of which settings to change is made (step 47). It is worth recalling from above that not all settings in a grand scheme are necessarily applied and that not all control panel settings are subject to being changed. Once the settings to be changed have been ascertained, the settings of the control panel are changed to reflect those settings marked as applicable that are encapsulated within the scheme or grand scheme being applied (step 48). There is flexibility in that certain system settings within a scheme or grand scheme may be designated as not applicable. Such system settings are not applied when the scheme or grand scheme is applied.

Figure 7A:
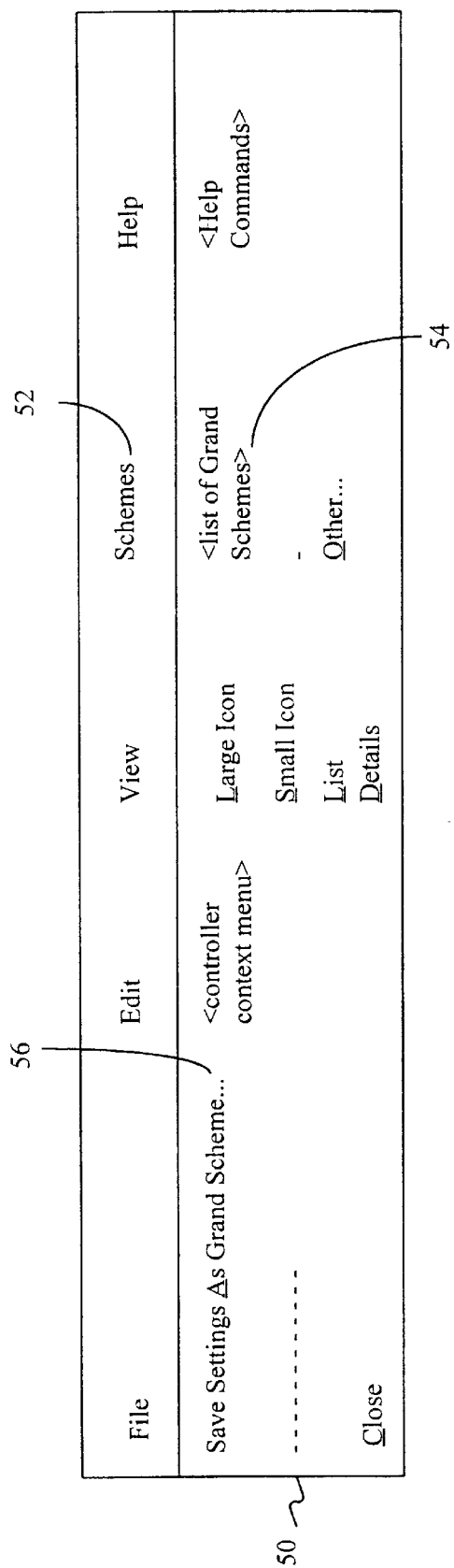
FIG. 7A illustrates a menu for a control panel in accordance with the preferred embodiment of the present invention.

The preferred embodiment of the present invention provides multiple mechanisms for applying grand scheme to the control panel (see step 46 in FIG. 6). Those skilled in the art will appreciate that these three approaches are not intended to be exhaustive or limiting of the present invention. With reference to FIG. 7A, a first approach to applying a grand scheme to the control panel is via menu bar 50 that is provided by the control panel. The menu bar 50 provided within the control panel includes a "Schemes" option 52 that when activated displays a list of grand schemes 54. The user may choose any one of the grand schemes displayed within the list 54 to apply the settings of the selected grand scheme to the control panel.

Figure 7B:
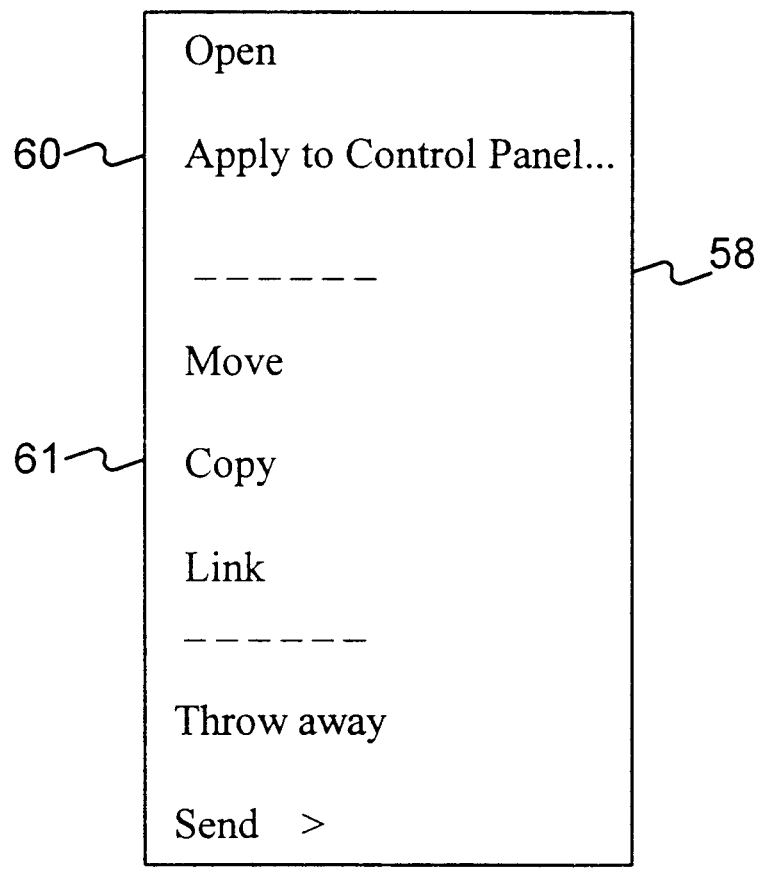
FIG. 7B illustrates an example of a context menu for a grand scheme.

A second option provided by the preferred embodiment of the present invention to apply a grand scheme to the control panel is provided in a context menu 58 (FIG. 7B) of a grand scheme. The context menu 58 is displayed by double clicking on an icon for the grand scheme using mouse 14. One of the options provided within the context menu 58 is option 60 to apply the grand scheme to the control panel.

Figure 7C:
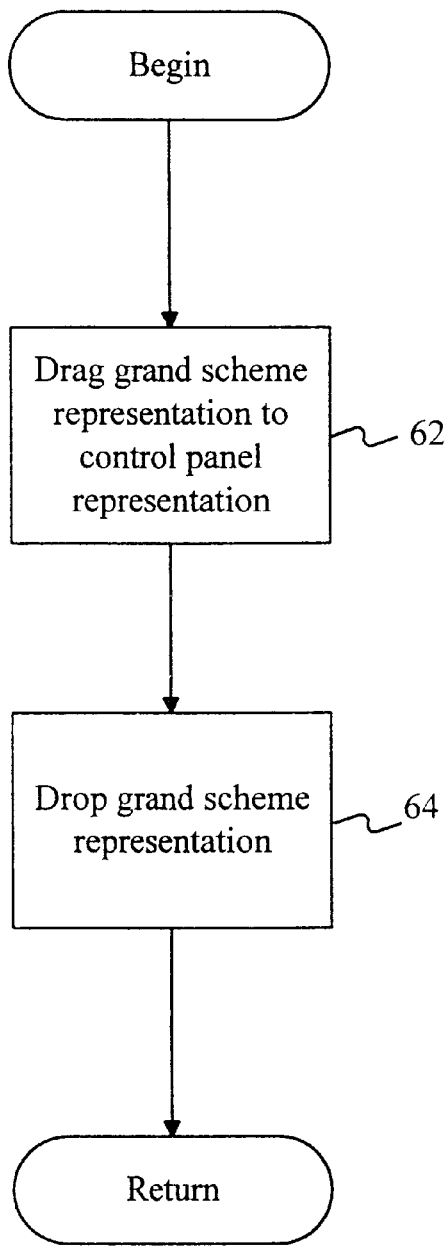
FIG. 7C illustrates steps performed to drag and drop a grand scheme on a control panel in accordance with the preferred embodiment of the present invention.

The third option for applying a grand scheme to the control panel in the preferred embodiment of the present invention is to perform a drag-and-drop operation. FIG. 7C shows the steps that are performed in such an operation. In particular, a representation of the grand scheme (such as an open grand scheme window or an icon for a grand scheme) is dragged using the mouse 14 to be over a control panel representation (such as control panel icon or an open control panel window) (step 62 in FIG. 7C). The grand scheme representation is then dropped (step 64) so as to apply the grand scheme to the control panel.

Hence, it can be seen that the preferred embodiment provides a number of easily implemented ways to update control panel settings with grand schemes. Multiple approaches are provided to suit the user's preference.

Three approaches are provided by the preferred embodiment of the present invention to apply schemes, as opposed to grand schemes, to the control panel to change control panel system settings for given controllers (see step 46 in FIG. 6). Those skilled in the art will appreciate that the present invention is not limited to these approaches to applying the schemes to the control panel. These approaches are merely illustrative.

In a first approach, menu 66 (FIG. 8A) is used to apply a scheme to the control panel. Menu 66 is provided by a controller when opened. Menu 66 includes a schemes option 68 that, when selected by the user, displays a list of schemes 70. The user then selects one of the schemes to apply the settings of the scheme as the current settings for the controller.

A second approach that may be used to apply a scheme to the control panel is to activate a context menu 74 (FIG. 8B) for the scheme. The context menu 74 is activated by clicking on the icon of the scheme using mouse 14. The context menu 74 includes an option 76 to apply the scheme to the control panel. When the user selects this option, the scheme is applied and the system settings are changed in the control panel.

Figure 8A:
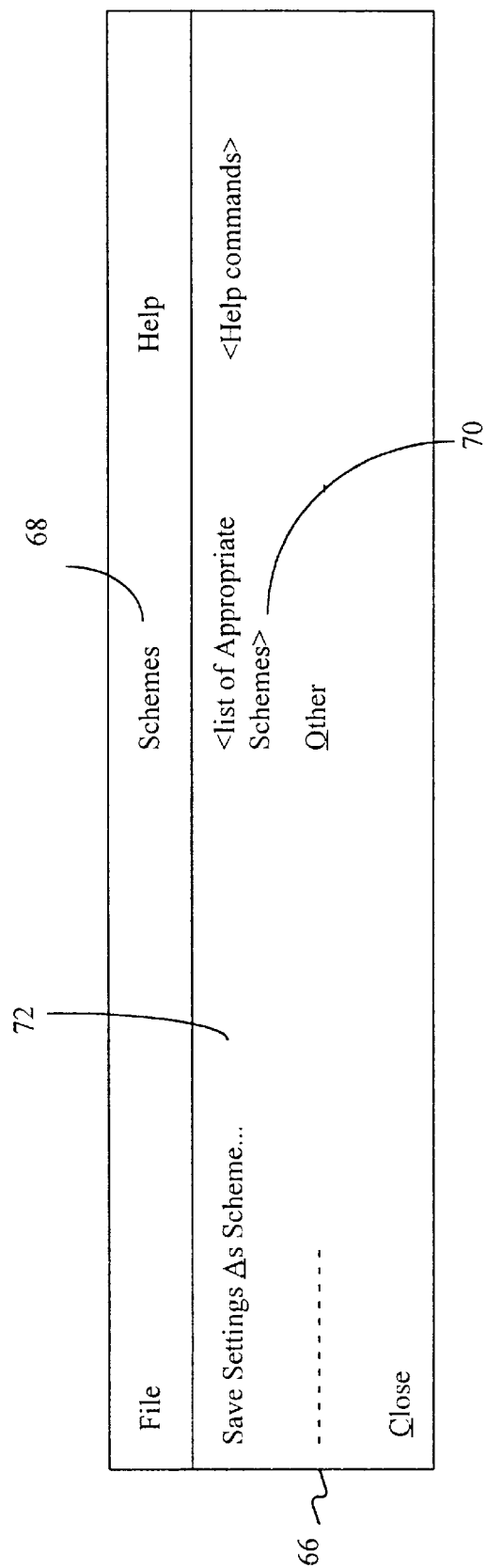
FIG. 8A is a diagram illustrating an example of a menu for a controller in accordance with the preferred embodiment of the present invention.
Figure 8B:
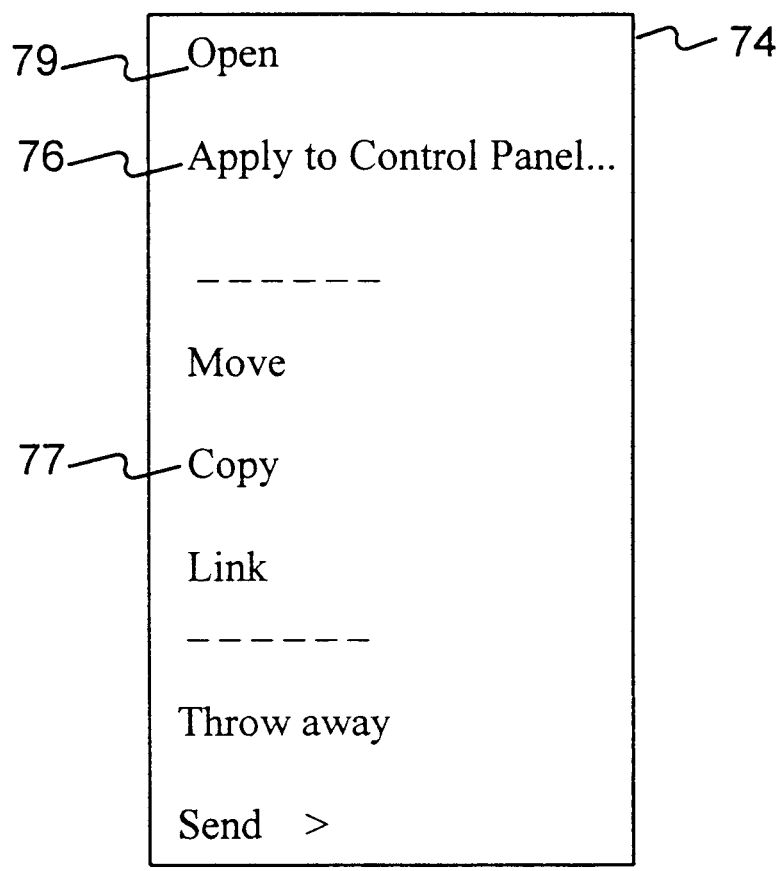
FIG. 8B is a diagram illustrating an example of a context menu for a scheme.
Figure 8C:
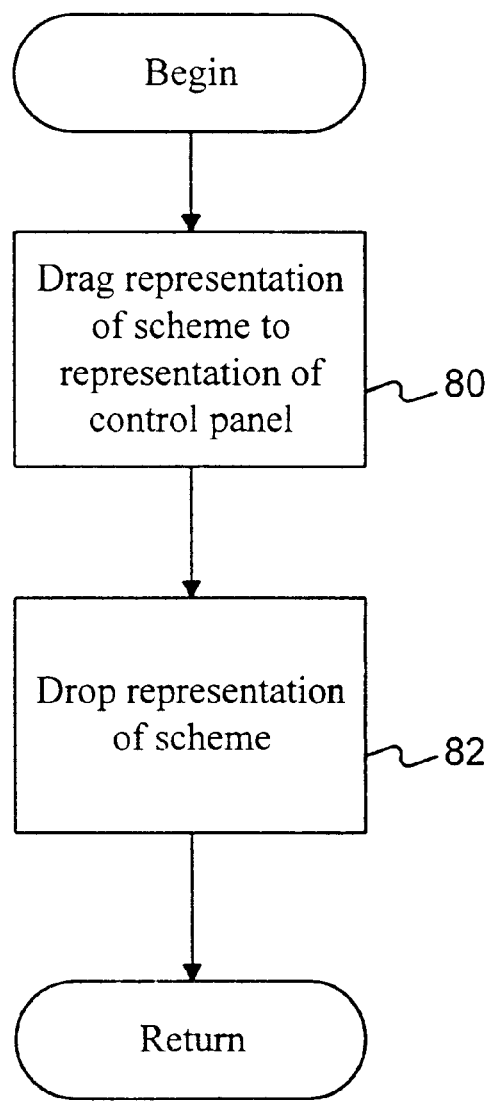
FIG. 8C is a flow chart illustrating the steps performed to drag-and-drop a scheme onto the control panel in the preferred embodiment of the present invention.

A third option for applying a scheme to the control panel is to perform a drag-and-drop operation. FIG. 8C shows the steps that are performed in such a drag-and-drop operation for a scheme. First, a representation of the scheme, such as an open window or an icon, is dragged to a representation of the control panel (step 80). The representation of the scheme is then dropped to apply the scheme to the control panel (step 82).

It should be appreciated that each controller decides which settings may be encapsulated into a scheme. A controller may have some settings that are not encapsulated into a scheme. For example, system environment variables, such as the path to the system root, may be sorted with a controller but may not be part of a scheme. In addition, a scheme may include settings that are not applied to the control panel when the scheme is applied to the control panel. The settings that are not subject to being incorporated into schemes and the settings within schemes that are not subject to being applied to the control panel are disabled when the scheme is opened.

The above discussion notes that schemes or grand schemes may be dragged and dropped to realize the changing of system settings. The Microsoft OLE 2.0 protocol provides a number of interfaces that facilitate such drag-and-drop operations. An application registers a window as a drop target by calling a RegisterDragDrop( ) function that is provided by Microsoft OLE 2.0. In addition, the drop target supports the IDropTarget interface as defined within Microsoft OLE 2.0 and the drop source supports the IDropSource interface. More details regarding these interfaces can be found in *Inside OLE* 2, by Kraig Brockschmidt, Microsoft Press, 1994.

Figure 9A:
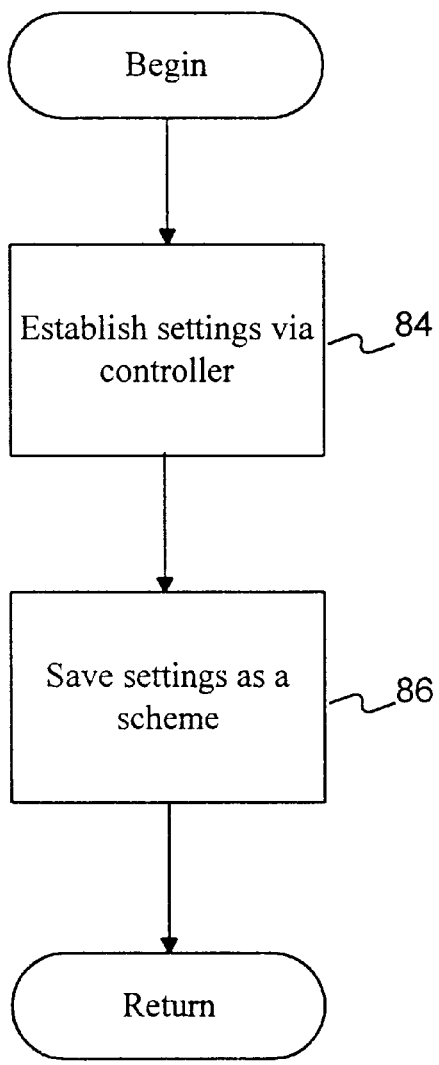
FIG. 9A is a flow chart illustrating the steps of a first approach for creating a scheme in accordance with the preferred embodiment of the present invention.

The preferred embodiment of the present invention provides a number of different ways for the user to create a scheme. FIG. 9A is a flow chart showing the steps performed in one approach for creating a scheme. Initially, the user establishes the settings to be incorporated into a scheme using the dialog box 30 (FIG. 3) of a controller (step 84). The settings are then saved as a scheme (step 86). For example, the background settings of no pattern and no wallpaper shown in FIG. 3 may be encapsulated into a scheme. The settings may be saved as a scheme by invoking option 72 within the menu 66 of the controller, as shown in FIG. 8A. Option 72 saves the current settings of a controller as a scheme.

Figure 9B:
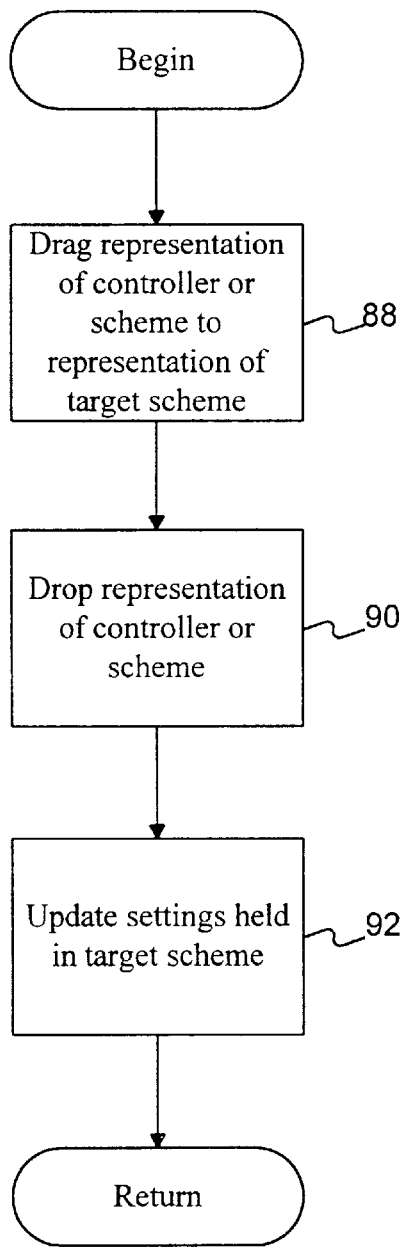
FIG. 9B is a flow chart illustrating the steps of a second approach for creating a scheme in accordance with the preferred embodiment of the present invention.

A second approach to creating a scheme is to perform a drag-and-drop operation. FIG. 9B is a flow chart illustrating the steps that are performed to create a scheme in this fashion. A representation of a controller or scheme (such as an icon or a window for a controller or a scheme) is dragged using mouse 14 to a representation of a target scheme (step 88). The representation of the controller or scheme is then dropped (step 90). The target scheme then updates the settings encapsulated within it to reflect the settings of the controller or scheme that has been dropped upon it. In the Microsoft OLE 2.0 protocol, the target scheme is given a data pointer to a data object that holds the values of the settings for the controller or scheme that is dropped on it (step 92). It accesses this data object to update its own settings. For example, suppose a user wishes to create a scheme holding current desktop settings. The user may then drag the desktop controller 28D (FIG. 2) and drop it in the scheme folder 36 (FIG. 3) to create a scheme object holding the same desktop settings.

Figure 9C:
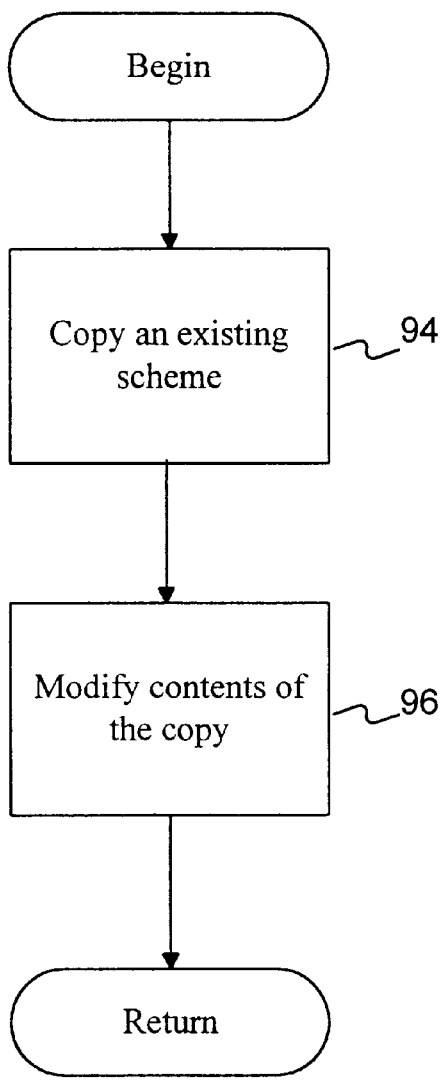
FIG. 9C is a flow chart illustrating the steps of a third approach for creating a scheme in accordance with the preferred embodiment of the present invention.

FIG. 9C is a flow chart showing the steps that are performed in a third approach to create a scheme object. First, an existing scheme is copied by choosing an option such as the "Copy" option 77 in context menu 74 for a scheme (step 94). The contents of the scheme are then modified to establish new settings and, thus, create the new scheme (step 96).

Figure 10:
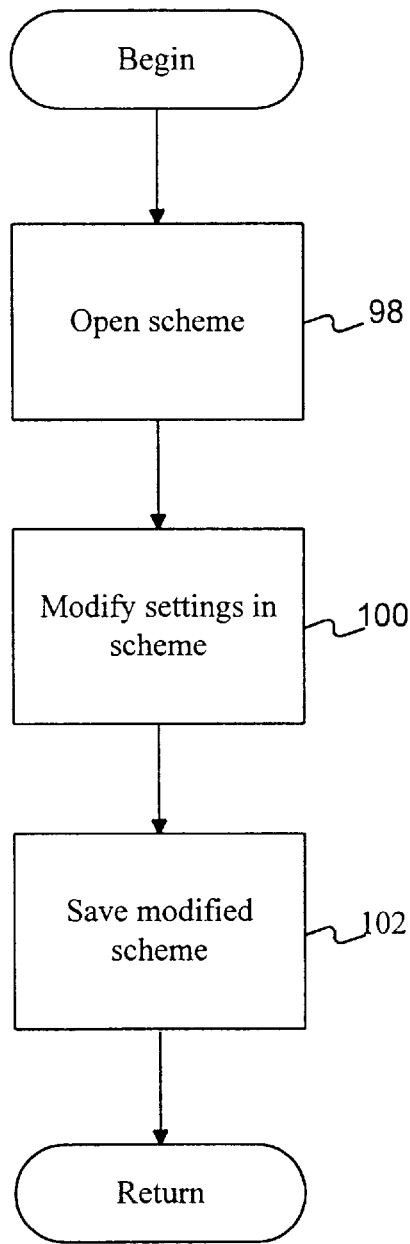
FIG. 10 is a flow chart illustrating the steps performed to edit a scheme in accordance with the preferred embodiment of the present invention.

FIG. 10 is a flow chart illustrating the steps the are performed to modify the settings within a scheme, such as in step 96 of FIG. 9C. First, the scheme is opened so that a window is displayed and the contents of the scheme displayed (step 98). A scheme may be opened by double clicking with the mouse 14 on an icon representing the scheme or by choosing the "open" option 79 (FIG. 8B) from the context menu 74 of the scheme (step 98 in FIG. 10). The contents of the scheme are then available and may be directly manipulated via dialog box 30, which is the same dialog box that is used by the corresponding controller (FIG. 3). The user may then modify the settings of the scheme using dialog box 30 (step 100 in FIG. 10). The modified scheme is saved by choosing the "OK" button that is available within the dialog box 30 (step 102).

Figure 11A:
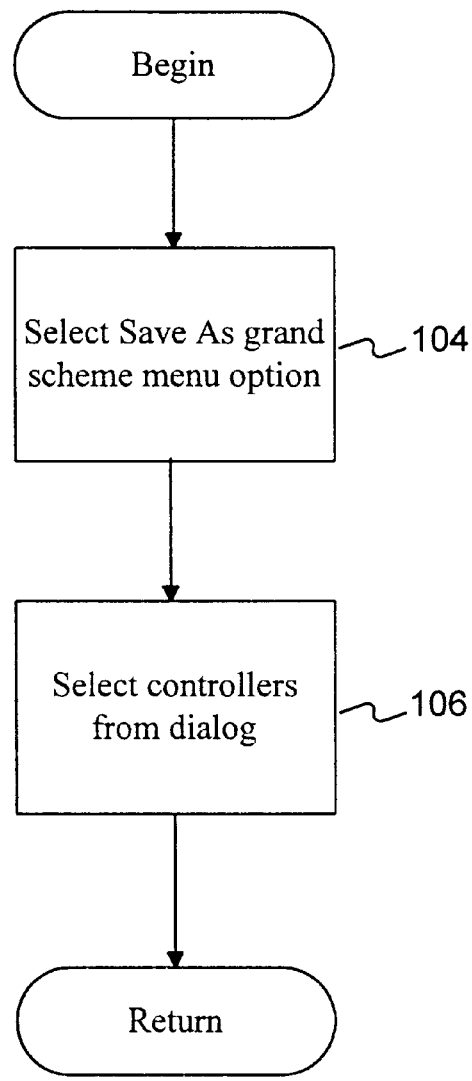
FIG. 11A is a flow chart illustrating the steps of a first approach for creating a grand scheme in accordance with the preferred embodiment of the present invention.

Just as with schemes, there are a number of different approaches provided by the preferred embodiment of the present invention for modifying the contents of grand schemes and for creating grand scheme objects. FIG. 11A is a flow chart illustrating a first approach to creating a grand scheme object. In accordance with this first approach, the user has opened the control panel and has selected option 56 (save settings as grand scheme) from the control panel menu 50 (step 104). This option 56 requests the user to select which controllers are to have their settings incorporated into the grand scheme. The user selects the controller using the dialog provided by option 56 (step 106 in FIG. 11A).

Figure 11B:
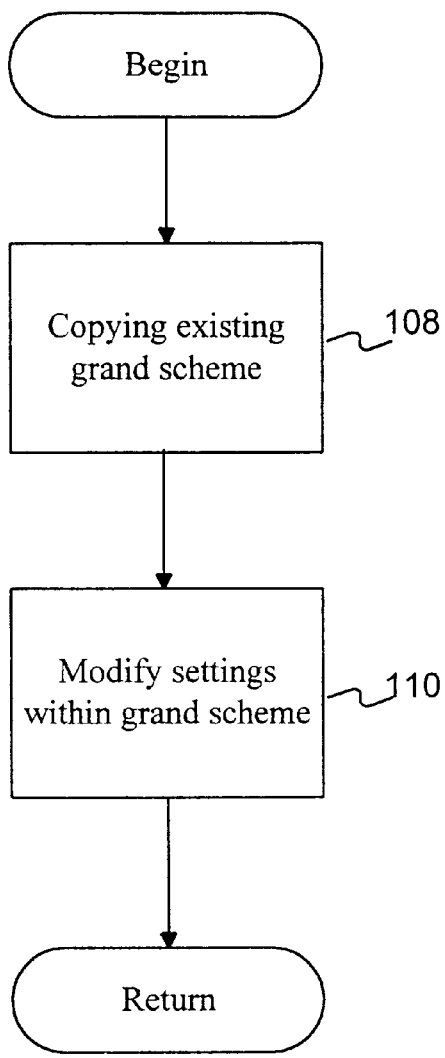
FIG. 11B is a flow chart illustrating the steps of a second approach for creating a grand scheme in accordance with the preferred embodiment of the present invention.

FIG. 11B is a flow chart showing the steps that are performed in a second approach to create a grand scheme object. First, an existing grand scheme is copied, such as in response to a user selecting copy option 61 (FIG. 7B) from the grand scheme context menu 58 (step 108 in FIG. 11B). The user then may modify the settings within the grand scheme by opening each scheme contained therein and editing the contents (step 110).

Figure 11C:
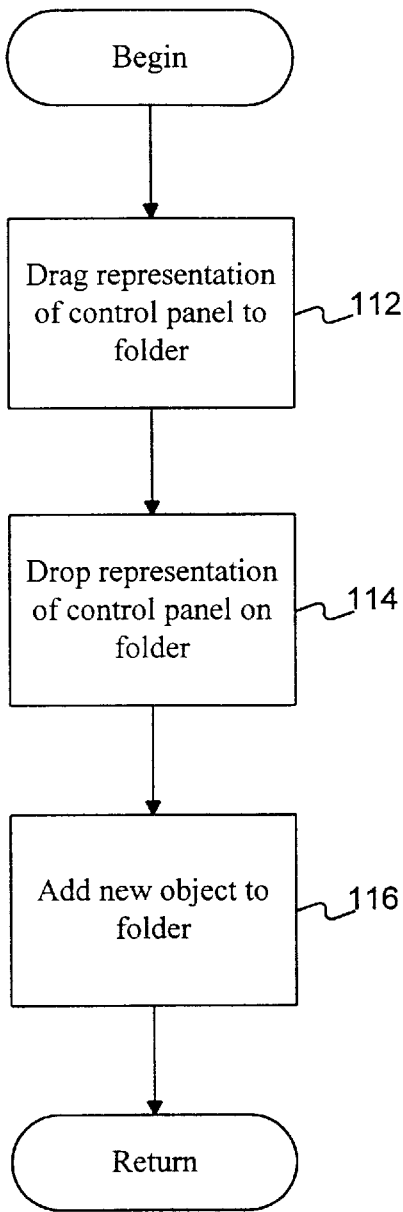
FIG. 11C is a flow chart illustrating the steps of an approach for creating an object holding system settings of a control panel in accordance with the preferred embodiment of the present invention.

FIG. 11C shows a flow chart of the steps that are performed in an option for creating an object holding system settings. First, a representation of a control panel is dragged to a representation of a folder, such as a schemes folder (step 112). The representation is then dropped (step 114), causing a new object holding the system settings of the control panel to be added to the folder (step 116).

Figure 12:
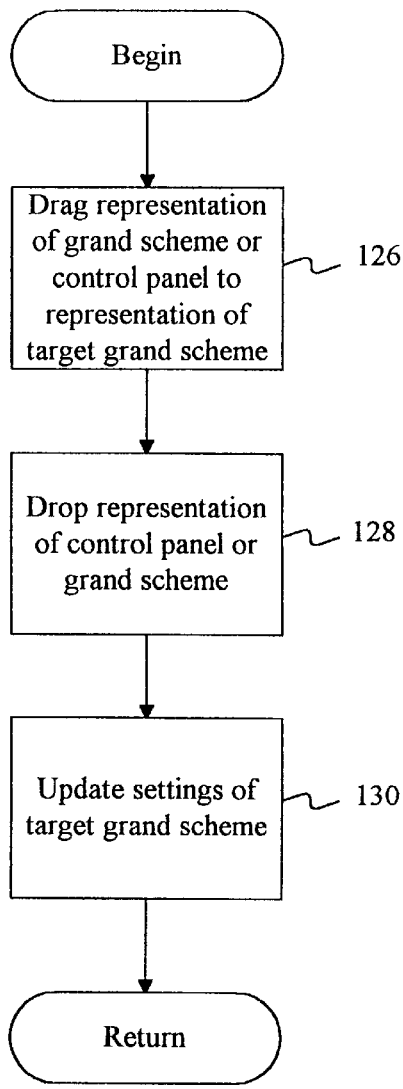
FIG. 12 is a flow chart illustrating the steps of a second approach for modifying a grand scheme in the preferred embodiment of the present invention.

FIG. 12 shows an approach for modifying the contents of a grand scheme. In this approach, a controller or scheme is dragged or dropped onto a grand scheme. In step 126, a representation of a controller or scheme is dragged to a representation of a grand scheme. The representation of the controller scheme is then dropped (step 128). The settings for the scheme that corresponds with the controller or scheme that is dropped are then updated to reflect the values of the controller or scheme that has been dropped (step 130). Those skilled in the art will appreciate that a grand scheme may be directly modified by opening its controllers and modifying the system settings.

While the present invention has been described with reference to a preferred embodiment thereof, those skilled in the art will nevertheless appreciate that various changes and forms in detail may be made without departing from the intended scope of the present invention as defined in the appended claims.

What is claimed is:

1. In a computer system having a video display and a storage device and running an operating system that provides a desktop environment to a user and a file system, said desktop environment having associated system settings that affect the desktop environment, a method comprising the steps of:
    storing in the storage device a first set of values for at least a portion of the system settings so that the first set of values is visible in the file system;
    storing in the storage device a second set of values for the same portion of the system settings for which values are stored in the first set of values so that the second set of values is visible in the file system; and
    in response to a user choice between the first set of values and the second set of values, updating the systems settings to have the values of the set of values that has been chosen by the user.

2. The method of claim 1 wherein the step of storing in the storage device the first set of values comprises the step of storing in the storage device the first set of values for all of the system settings that a user may change so that the first set of values is visible in the file system.

3. The method of claim 1 wherein at least one of the system settings affects appearance of the desktop environment.

4. The method of claim 1 wherein at least one of the system settings affects behavior of the desktop environment.

5. The method of claim 1 wherein the first set of values and the second set of values are stored as a first object and second object, respectively.

6. The method of claim 1, further comprising the step of storing in the storage device a third set of values for the same portion of the system settings for which values are stored in the first and second sets of values, said third set of values being visible in the file system.

7. In a computer system having a storage device and running an operating system that provides an operating environment to a user, said operating environment being specified by values of system settings, a method comprising the steps of:
    providing a control panel for controlling current values of the system settings;
    storing sets of values for the system settings in the storage device, each set including values for at least a portion of the system settings;
    providing an interface for enabling the user to select one of the sets of values; and
    in response to a selection of one of the sets of values by the user, changing the current system settings to have the values of the selected set of values.

8. The method of claim 7 wherein the set of values selected by the user includes values for all of the system settings whose values are controlled by the control panel.

9. The method of claim 7 wherein the set of values selected by the user includes values for only a subset of the system settings whose values are controlled by the control panel.

10. The method of claim 7, further comprising the step of providing a user interface for the control panel that enables the user to select at least one new value for the system settings.

11. In a computer system running an operating system that provides an operating environment to a user and a file system wherein the operating environment has system settings that affect the operating environment, a method comprising the steps of:
    providing a control panel for controlling current values of the system settings, the control panel including controllers that each are responsible for controlling current values of a group of related ones of the system settings;
    providing the user with at least two sets of values for an identified one of the groups of related system settings such that the sets of values are visible in the file system; and
    in response to a selection by the user of one of the sets of values, changing the current values of the identified group of related system settings to the values in the set of values selected by the user.

12. The method of claimed 11, further comprising the step of providing the user with additional sets of values visible in the file system for ones of the groups of related system settings that differ from the identified group.

13. The method of claim 12, further comprising the step of, in response to selection by the user of certain of the additional sets of values, changing the system settings for the groups of related system settings for which the selected additional sets of values hold values, to the values held in the selected additional sets of values.

14. The method of claim 11, further comprising the step of providing the user with another set of values visible in the file system for system settings in multiple ones of the groups of related system settings.

15. The method of claim 14, further comprising the step of, in response to the user selecting the other set of values, changing the current values of the multiple groups for which the other set of values holds values, to the values in the other set.

16. In a computer system having a storage device and running an operating system that provides an operating environment to a user, said operating environment conforming to current system settings, a method comprising the steps of:

storing a grand scheme container object in the storage device;

storing scheme objects within the grand scheme container object, each scheme object holding a set of values for a subset of the system settings;

applying the values held in the scheme objects contained in the grand scheme container object to the current system setting so as to change the values of the current system settings to the values held in the scheme objects of the grand scheme container object.

17. The method of claim 16, further comprising the step of storing an additional grand scheme container object holding scheme objects in the storage device.

18. The method of claim 17, further comprising the step of storing the grand scheme container objects and the scheme objects in a folder object.

19. In a computer system having an input device and a video display and running an operating system that provides an operating environment to a user as specified by system settings, a method comprising the steps of:

providing a first object holding values for system settings, said first object having a representation on the video display;

providing a second object holding system settings, said second object having a representation on the video display;

dragging the representation of the first object on the video display to lie over at least a portion of the representation of the second object in response to the user using the input device;

dropping the representation of the first object on the representation of the second object in response to the user using the input device;

in response to the dropping of the representation of the first object on the representation of the second object, changing the values for system settings in the second object to the values for system settings in the first object.

20. The method of claim 19 wherein the second object is a control panel object that controls current values for the system settings.

21. The method of claim 20 wherein the first object is a scheme object holding values for only a subset of the system settings whose values that are controlled by the control panel, thereby changing only the subset.

22. The method of claim 20 wherein the first object is a grand scheme object holding values for all of the system settings whose values are controlled by the control panel, thereby changing all of the values.

23. The method of claim 19 wherein the second object is a grand scheme object containing scheme objects that each hold values for subsets of the system settings whose values are controlled by the control panel and the first object is an additional scheme object that holds values for a subset of the system settings whose values are controlled by the control panel.

24. The method of claim 19 wherein the first object is a grand scheme object and the second object is a control panel object that controls current values for the system settings.

25. The method of claim 19 wherein both the first object and the second object are scheme objects.

26. A data processing system comprising:

a processor for running an operating system that provides a file system and a desktop environment to the user, said desktop environment having an associated set of system settings that affect the desktop environment;

a storage comprising:
(i) a copy of the operating system;
(ii) a first set of values for at least a portion of the system settings so that the first set of values is visible in the file system;
(iii) a second set of values for the same portion of the system settings for which values are stored in the first set of values so that the second set of values is visible in the file system; and a vehicle for updating the system settings, in response to a user choice of one of the sets of values, to have the values of the set of values that was chosen by the user.

27. The data processing system of claim 26, further comprising a folder in the storage that holds a first set of values and the second set of values.

28. A system for providing a desktop environment to a user, said desktop environment having associated system settings that affect it, comprising:

a display component for displaying an interface to a user as part of the desktop environment according to the system settings;

a first container holding a first set of system settings values;

a second container holding a second set of system settings values;

a selection component that receives selection information and in response selects between the first container and the second container; and a change component responsive to the selection component for changing the system settings to those held in the selected container.

29. A computer-readable storage medium for use in a computer system having a video display and a storage device and running an operating system that provides a desktop environment to a user and a file system, wherein said desktop environment has associated system settings that affect the desktop environment, said medium holding:

a first set of values for at least a portion of the system settings wherein the first set of values is visible in the file system;

a second set of values for the same portion of the system settings for which values are stored in the first set of values wherein the second set of values is visible in the file system; and a system settings update component for updating the system settings to have the values of a one of the first set of values, the second set of values, or that has been chosen by a user.

30. The computer-readable storage medium of claim 29 wherein the first set of values is stored in a first object and the second set of values is stored in a second object.

31. A computer-readable storage medium for use in a computer system having a storage device and running an operating system that provides an operating environment to a user that conforms to current system settings, said medium holding:

a grand scheme container object that holds scheme objects wherein each scheme object holds a set of values for a subset of the system settings; and a component for applying the values held in the scheme objects in the grand scheme container object to the current system settings so as to change the values of the current system settings to the values held in the scheme objects of the grand scheme container object.

32. A computer-implemented method for modifying an appearance of a desktop environment of a computer system, the desktop environment providing a plurality of parameters, each parameter settable to values that control the appearance of an aspect of the desktop environment, the method comprising:

receiving from a user a first set of values for the parameters;

storing the received first set of values;

receiving from the user a second set of values for the parameters;

storing the received second set of values;

receiving from the user a selection of either the first set of values or the second set of values;

when the selection of the first set of values is received from the user, setting the parameters to the values of first set of values; and when the selection of the second set of values is received from the user, setting the parameters to the values of the second set of values whereby the user can specify sets of values and whereby the computer system sets the parameters to the values of a set when the user selects that set of values so that the appearance of the desktop environment is modified in accordance with the selected set of values.

33. The method of claim 32 wherein the storing of the received sets of values stores the sets of values using a file system.

34. The method of claim 32 wherein the user selects a set of values by dragging and dropping a visual representation of the set of values over a visual representation of the parameters.

35. The method of claim 32 wherein the parameters are set under control of an operating system.

36. The method of claim 32 including changing a value in the first set of values so that subsequent selection of the first set results in modifying the appearance of the desktop environment in accordance with the changed value.

37. The method of claim 32 wherein the parameters are divided into control groups, each control group having a controller for setting the values of the parameters of that control group, and wherein the first set of values is for parameters of a plurality of control groups.

38. The method of claim 37 wherein the setting of the values of the parameters is performed by the controllers for the plurality of control groups.

39. A computer-readable medium containing instructions for causing a computer system to modify the appearance of a desktop environment of a computer system, the desktop environment providing a plurality of control groups having parameters, each parameter of a control group settable to a value that controls the appearance of an aspect of the desktop environment, each control group having a controller for controlling the setting of the values of the parameters in the control group, by:

storing in a file a first set of values for parameters included in more than one control group;

storing in a file a second set of values for the parameters included in more than one control group;

receiving from a user a selection of either the stored first set of values or the stored second set of values;

when the selection of the first set of values is received from the user, invoking the controllers of the control groups that include parameters of the first set of values to set the parameters to the values of first set of values; and when the selection of the second set of values is received from the user, invoking the controllers of the control groups that include parameters of the second set of values to set the parameters to the values of second set of values whereby the user can select a set of values so that the values of the parameters of more than one control group can be set by the selection of the set of values.

40. The computer-readable medium of claim 39 wherein the user selects a set of values by dragging and dropping a visual representation of the set of values over a visual representation of the parameters.

41. The computer-readable medium of claim 39 wherein the parameters are set under control of an operating system.

42. The computer-readable medium of claim 39 including changing a value in the first set of values so that subsequent selection of the first set results in modifying the appearance of the desktop environment in accordance with the changed value.

* * * * *